United States Patent [19]

Myers et al.

[11] Patent Number: 4,807,477

[45] Date of Patent: Feb. 28, 1989

[54] CAPACITIVE TEMPERATURE COMPENSATION FOR A PRESSURE SENSOR

[75] Inventors: Donald O. Myers, Elgin; Gregory D. Stamm, La Grange, both of Ill.

[73] Assignee: Motorola, Inc., Schaumburg, Ill.

[21] Appl. No.: 150,602

[22] Filed: Feb. 1, 1988

[51] Int. Cl.⁴ .......................... G01L 9/12; G01L 19/04
[52] U.S. Cl. ...................................................... 73/708
[58] Field of Search ........................ 73/708, 718, 724; 330/107, 294

[56] References Cited

U.S. PATENT DOCUMENTS

| | | | |
|---|---|---|---|
| 3,061,767 | 10/1962 | Toro | 317/247 |
| 3,465,276 | 9/1969 | Silva et al. | 330/107 |
| 3,715,638 | 2/1973 | Polye | 317/247 |
| 4,092,696 | 5/1978 | Boesen et al. | 361/283 |
| 4,187,479 | 2/1980 | Ishizuka et al. | 330/107 |
| 4,195,326 | 3/1980 | Ruegg et al. | 361/274 |
| 4,380,041 | 4/1983 | Ho | 361/283 |
| 4,384,899 | 5/1983 | Myers | 148/1.5 |
| 4,392,382 | 7/1983 | Myers | 73/708 |
| 4,550,611 | 11/1985 | Czarnocki | 73/708 |
| 4,581,795 | 4/1986 | Mobbs et al. | 29/29.42 |
| 4,644,798 | 2/1987 | Tamura et al. | 73/708 |
| 4,656,871 | 4/1987 | Czarnocki | 73/724 |
| 4,683,437 | 7/1987 | Javeri | 328/133 |

Primary Examiner—Donald O. Woodiel
Attorney, Agent, or Firm—Phillip H. Melamed

[57] ABSTRACT

The undesired temperature variation of a capacitive pressure sensing element (10) having a positive temperature coefficient of capacitance (TCC) is compensated by a series resistor R and compensating capacitor ($C_c$) connected in parallel to the pressure sensing capacitor ($C_x$). The compensating capacitor and presssure sensing element have opposite polarity temperature coefficients of capacitance, and the magnitude of the resistor is selected such that its resistive impedance is nonnegligible and is comparable to the magnitude of the capacitive reactance of the pressure sensing capacitor or compensating capacitor at a predetermined operative frequency of an electrical signal applied to and/or determined by the pressure sensing and compensating capacitors.

20 Claims, 1 Drawing Sheet

CAPACITIVE TEMPERATURE COMPENSATION FOR A PRESSURE SENSOR

BACKGROUND OF THE INVENTION

The present invention generally relates to the field of compensating for undesired temperature variation of a capacitor. More specifically, the present invention relates to a compensating circuit and method for compensating for the undesired temperature variation of the capacitance of capacitor which, for example, can comprise a pressure sensing capacitive element.

In prior capacitive pressure sensors, a capacitive pressure sensing element, typically comprising a parallel plate capacitor, has the spacing between its plates varied in accordance with sensed pressure. This changes the capacitance of the sensing element, and this capacitance change is utilized to develop an electrical signal which varies in accordance with sensed pressure. However, in addition to the capacitance of the sensing element varying in accordance with sensed pressure, typically this capacitance also varies in accordance with temperature. Various types of temperature compensation circuits have been utilized to provide temperature compensation for this undesired temperature variation.

Some capacitive temperature compensation circuits utilize temperature varying resistors, such as thermistors, to produce a temperature-varying electrical signal which is then combined with a temperature-varying signal produced by a capacitor, such as a capacitive sensing element. However, thermistors generally have substantial stability problems, especially as they age. Also, typically only thermistors with negative temperature coefficients are usable for linear compensation applications, and positive temperature coefficient thermistors are only usable for switching applications. Thus proper circuit design for capacitor compensation circuits which use thermistors may be difficult. In addition, the providing of an additional temperature varying compensation signal due to a thermistor typically results in a complex temperature compensation system.

Some prior capacitor temperature compensation systems have attempted to reduce the temperature variation of a capacitor by directly connecting, in parallel to that capacitor, a compensation capacitor having a temperature coefficient of capacitance (TCC) polarity opposite to the TCC polarity of the capacitor to be compensated. However, typically such prior systems require matching of the magnitude of the TCC of the capacitor to be compensated for to the magnitude of the TCC of the compensation capacitor such that the two TCC's essentially cancel each other out. Achieving this in the real world presents a problem since typically the TCC of a capacitor cannot be readily adjusted. Thus these prior compensation systems are deficient in that they do not readily allow a selective adjustment of the temperature compensation circuit so as to provide a desired effective composite temperature variation of a capacitive sensing element and a compensation capacitor, wherein typically a zero composite temperature variation is desired.

SUMMARY OF THE INVENTION

An object of the present invention is to provide an improved capacitor temperature compensation system and method which overcomes the above-noted deficiencies.

A more specific object of the present invention is to provide an improved capacitive pressure sensor having temperature compensation wherein the temperature compensation can be readily adjusted to provide a desired result while implementing this with minimal cost and circuit complexity.

In one embodiment of the present invention a capacitive temperature compensation circuit is provided comprising: a first capacitor connected between two end terminals, said first capacitor having a predetermined temperature coefficient of capacitance (TCC) with a predetermined polarity and providing a predetermined capacitive impedance at a predetermined operative signal frequency of a signal to be applied to and/or determined by said first capacitor; an additional compensation capacitor connected in series with a resistor, said additional capacitor having a predetermined temperature coefficient of capacitance with a predetermined polarity opposite to said first capacitor temperature coefficient of capacitance polarity, said series connection of said additional capacitor and said resistor being connected in parallel with said first capacitor across said two end terminals; and means for providing, at at least one of said two end terminals, a signal having a predetermined operative signal frequency, said resistor providing a nonnegligible resistive impedance at said predetermined operative signal frequency as compared to said first capacitor impedance and said additional capacitor impedance at said predetermined operative signal frequency, whereby the composite temperature coefficient of capacitance of said first and additional capacitors across said two end terminals is effectively determined by the magnitude of said resistor impedance.

In a particular embodiment of the present invention, a capacitive pressure sensor is disclosed in which undesired temperature variations of a variable capacitor, comprising a capacitive sensing (transducer) element, can be effectively selectively reduced by merely the adjustment of the resistance of a resistor connected in series with a compensating capacitor, the series connection of these components being connected in parallel with the variable capacitor to be compensated. In this configuration, the TCC of the compensating capacitor has a polarity opposite to the TCC polarity of the variable capacitor to be compensated for. In addition, the impedance of the resistor will be comparable to the reactive impedances of the compensating and variable capacitors at a predetermined operative frequency of a signal applied to these elements, which signal results in an output signal varying in accordance with a parameter, other than temperature, being sensed by the capacitor sensing element. Thus by an extremely simple temperature compensation circuit, the adjustment of a resistor allows providing a desired temperature variation for a sensing circuit which includes a capacitor sensing element which varies in accordance with a parameter, such as pressure, as well as in accordance with temperature. Since the TCC of capacitors is stable, this compensating circuit has inherent stability as compared with thermistor-compensating circuits. Also, the ease of adjustment of the present compensating circuit allows obtaining whatever temperature variation for the output signal is desired. These and other objects of the present invention will be more fully understood by reference to the following detailed description of the present invention.

BRIEF DESCRIPTION OF THE DRAWINGS

For a more complete understanding of the present invention, reference is made to the drawings in which.

DETAILED DESCRIPTION OF THE PRESENT INVENTION

Figure 1:
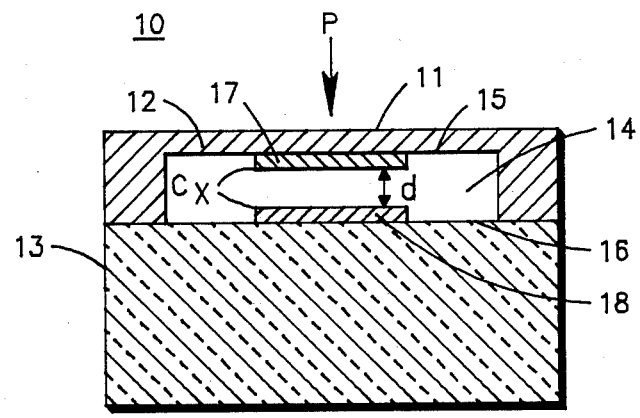
FIG. 1 is a cross-sectional view of a typical capacitive pressure sensing element usable with the temperature compensation circuit of the present invention.

Referring to FIG. 1, a cross-sectional diagram of a capacitive pressure sensing element (transducer) 10 is illustrated. The element can correspond to either a silicon capacitive absolute pressure sensor (SCAP) or a ceramic capacitive pressure transducer (CCT) such as shown in U.S. Pat. Nos. 4,384,899 or 4,380,041, respectively, each assigned to the same assignee as the present invention. In either case, the pressure P of a fluid, gaseous or liquid, to be sensed is applied to an external surface 11 of a relatively thin diaphragm 12 mounted to a relatively thicker base 13. An internal cavity 14 exists bounded by internal surfaces 15, 16 of the diaphragm and base, respectively A first capacitor electrode 17 is provided on the diaphragm and is located opposite to a second capacitor electrode 18 provided on the base. In response to variations in the sensed pressure P, the diaphragm 12 will deflect and the spacing d between the capacitor electrodes 17 and 18 will be alerted thereby producing a variable capacitance which varies in accordance with sensed pressure. The cavity 14 may either be sealed to provide an absolute pressure sensor or this cavity may open into an external cavity having a different pressure in which a relative pressure sensor is provided. In either case, the pressure sensing element 10 represents a pressure variable capacitor $C_x$ formed by the parallel capacitor plates 17 and 18, the spacing d between which is determined in accordance with sensed pressure.

Figure 2:
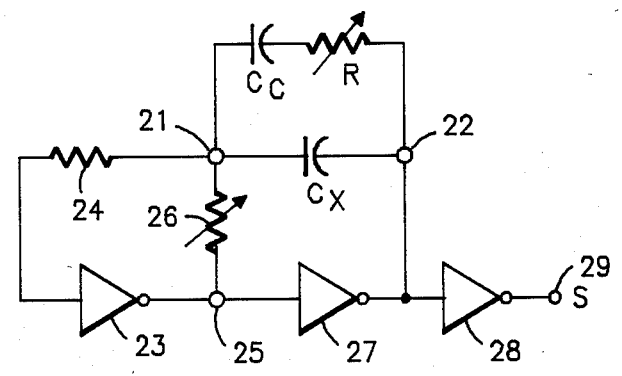
FIG. 2 is a schematic diagram of a capacitive temperature compensating circuit constructed in accordance with the present invention which utilizes the capacitive pressure sensing element shown in FIG. 1.

Referring now to FIG. 2, a circuit 20 for utilizing the capacitor $C_x$ to provide an output signal which varies in accordance with sensed pressure is illustrated. The capacitor $C_x$ is connected between two end terminals 21 and 22, and this capacitor is part of an oscillator circuit in the circuit 20. A first inverting operational amplifier 23 has an input connected to the terminal 21 through a resistor 24 and has its output connected to a terminal 25. The terminal 25 is connected via an adjustable resistor 26 to the terminal 21. A second inverting operational amplifier 27 has its input directly connected to the terminal 25 and its output connected to the terminal 22 which is also connected as an input to a third inverting operational amplifier 28 having its output connected to an output terminal 29. A temperature compensating capacitor $C_c$ is connected in series with a selectable or adjustable resistor R, and this series connection is directly connected in parallel to the pressure variable capacitor $C_x$ and, therefore, connected across the end terminals 21 and 22 as shown in FIG. 2. The operation of the circuit 20 is as follows.

First, ignoring the effect of the compensating circuit consisting of the capacitor Cc and the resistor R, the above-described circuit configuration operates as follows. The circuit 20 essentially comprises an oscillator in which the capacitance of the capacitor $C_x$ and the resistance of resistor 26 determines the frequency of the signal produced by the oscillator at the terminal 22. The operational amplifier 28 essentially forms a buffer stage wherein an output signal S at the output terminal 29 merely represents the inverted signal at the terminal 22. It is, therefore, apparent that the frequency of the signal S at the output terminal 29 is determined in accordance with the capacitance provided by the capacitor $C_x$, and, therefore, that this output signal frequency will vary in accordance with sensed pressure since sensed pressure will alter the capacitance of the capacitor $C_x$. A similar pressure sensing oscillator configuration is shown in U.S. Pat. No. 4,550,611, but a totally different temperature compensation technique is utilized in that patent.

In some prior circuit configurations similar to the configuration of the circuit 20, as above described, it has been noted that in addition to the capacitance of capacitor $C_x$ varying as a function of sensed pressure, this capacitance will also have an undesired variation as a function of temperature. Typically, the temperature coefficient of capacitance (TCC) of capacitor $C_x$ will be fixed and can be either positive or negative depending upon the physical construction of the pressure sensing element 10. In either case, this temperature variation of the pressure sensing capacitance is undesired, since what is desired is a frequency of the output signal S at the terminal 29 which varies just in response to sensed pressure. Thus it is desired that the frequency of the signal S will be indicative of just sensed pressure and be independent of temperature so that the signal S will not have to be temperature compensated. However, as previously indicated, this is typically not the case.

According to the present invention, an additional temperature compensating capacitor $C_c$ is connected in series with a selectable or variable resistor R. This series combination is provided so as to reduce the temperature variation of the frequency of the output signal S at the terminal 29. This is accomplished since the TCC of the variable capacitor $C_x$ will have a predetermined either positive or negative polarity, and the TCC of the temperature compensating capacitor $C_c$ will be selected so as to have an opposite polarity TCC. In addition, the TCC of the capacitor $C_c$ will typically be fixed and be selected to implement a larger change in capacitance as a function of temperature than the change in capacitance implemented by the pressure variable capacitor $C_x$ as a function of temperature. Thus, assuming that the pressure variable capacitor $C_x$ has a positive TCC and that the compensating capacitor $C_c$ (which is typically a fixed capacitor value in that its capacitance does not vary as a function of sensed pressure P) has a negative TCC, the effective capacitance between the terminals 21 and 22 will initially have a negative TCC because initially the resistor R will typically have a low or negligible resistance value. With a low value for the resistance of resistor R, this will essentially connect the capacitors $C_c$ and $C_x$ in parallel resulting in a negative composite TCC. As the resistance of the resistor R is increased, there will be less of a contribution of the negative TCC contributed by the capacitor $C_c$, and it is, therefore, apparent that at some value of the resistor R a zero composite TCC for the capacitance between the terminals 21 and 22 will be provided. At this point, the capacitance between these terminals will still vary in accordance with sensed pressure P since the capacitor $C_c$ is fixed and the capacitor $C_x$ varies in accordance with the sensed pressure P.

The preceding description describes the method of the present invention for effectively adjusting the temperature variation of a pressure variable capacitance connected between the terminals 21 and 22 so as to achieve a desired temperature variation of this capacitance. Typically a zero capacitive variation as a function of temperature would be desired. According to the present invention, this is implemented by means of a simple resistive adjustment or selection. Adjustment of resistor R can be readily implemented since preferably the resistor R comprises a film resistor deposited on a substrate. Then the resistance of R can be selectively increased, by conventional thick film laser or abrasive resistor trimming techniques, from a relatively low resistance up to a substantially higher resistance. Of course, if the resistor R was increased too much such that it had an infinite resistance, then the TCC of the capacitance between the terminals 21 and 22 would correspond to just the TCC of the capacitor $C_x$, and no temperature compensation would be provided.

It is significant to note that the impedance of the resistor R, after selection of this resistor for the desired temperature compensation, will typically be nonnegligible as compared to the capacitive reactances of capacitors $C_x$ and $C_c$. Thus R will typically be between one hundredth and one hundred times the capacitive reactance of the capacitors $C_c$ and/or $C_x$ at the predetermined operative frequency of the oscillator formed by the circuit 20. These limits are merely to indicate that the resistor R is clearly not an effective open circuit and is also not an effective short circuit. What is significant is that the provision of the resistor R eliminates the requirement of precisely effectively matching the magnitude of the TCC of the compensating capacitor $C_c$ to the TCC of the pressure variable capacitor $C_x$. In actuality, this matching would be difficult to achieve. Through use of the resistor R any desired composite TCC for the capacitance between the terminals 21 and 22 can be achieved, as long as the composite TCC is between the TCC's of $C_x$ and $C_c$.

It should be noted that $C_x$ is a variable capacitor, as a function of sensed pressure, and will vary over an operative expected range of pressure between a range of maximum and minimum values of capacitance. To obtain optimum sensitivity of signal S in response to pressure changes, the capacitance of $C_c$ should preferably be less than one-tenth of the minimum expected capacitance of $C_x$.

For the actual adjustment of a typical pressure sensing circuit, the output parameter, the frequency of the signal S at the terminal 29, would first be measured at room temperature. Then the measuring circuit 20, or at least the pressure variable capacitor $C_x$, and the compensating capacitor $C_c$ would be brought up to maximum expected operating temperature without any change in sensed pressure. Then the compensation resistor R would be trimmed, increased in resistance, to bring the output parameter (the frequency of the signal S at the terminal 29) to the previous room temperature value. The circuit 20 would now be temperature compensated, and the adjusted value of resistor R would be fixed (maintained).

While the present invention has been described in terms of a pressure sensing capacitor utilized in an oscillator circuit, the concept of the present invention is also applicable to any capacitor for which temperature compensation is desired. In addition, the present invention is applicable to other types of pressure sensing capacitive circuit configurations in which the resultant output signal does not have a frequency that varies as a function of sensed pressure or varying capacitance. One such configuration is illustrated in U.S. Pat. No. 4,656,871 in which a pressure varying capacitor has a fixed frequency oscillator signal applied to it and is utilized to provide a variable amplitude DC output signal where the value of the DC signal amplitude is related to sensed pressure.

While I have shown and described specific embodiments of the present invention, further modifications and improvements will be apparent to those of skill in the art. All such modifications and improvements which incorporate the basic invention claimed herein are within the scope of this invention.

We claim:

1. A capacitor temperature compensation circuit for use at a predetermined operative frequency of an operative electrical signal to be applied to and/or determined by a capacitor, comprising:

a first capacitor connected between two end terminals, said first capacitor having a predetermined temperature coefficient of capacitance (TCC) with a predetermined polarity and providing a predetermined capacitive impedance at a predetermined operative signal frequency of a signal to be applied to and/or determined by said first capacitor;

an additional compensation capacitor connected in series with a resistor, said additional capacitor having a predetermined temperature coefficient of capacitance with a predetermined polarity opposite to said first capacitor temperature coefficient of capacitance polarity, said series connection of said additional capacitor and said resistor being connected in parallel with said first capacitor across said two end terminals; and means for providing, at at least one of said two end terminals, a signal having a predetermined operative signal frequency, said resistor providing a non-negligible resistive impedance at said predetermined operative signal frequency as compared to said first capacitor impedance and said additional capacitor impedance at said predetermined operative signal frequency, whereby the composite temperature coefficient of capacitance of said first and additional capacitors across said two end terminals is effectively determined by the magnitude of said resistor impedance.

2. A capacitor temperature compensation circuit according to claim 1 wherein the composite temperature coefficient of capacitance of the combination of said first capacitor and said series circuit comprising said additional capacitor and said resistor is substantially less in absolute magnitude than said temperature coefficient of capacitance of said first capacitor.

3. A capacitor temperature compensation circuit according to claim 2 wherein said resistive impedance is no less than one hundredth of the magnitude of the impedances of either of said first and additional capacitors and is no more than one hundred times the impedance of either of said first and additional capacitors.

4. A capacitor temperature compensation circuit according to claim 3 wherein the TCC of said first capacitor is less, in absolute magnitude, than the TCC of said additional capacitor.

5. A capacitor temperature compensation circuit according to claim 4 wherein said first capacitor is variable, independent of temperature, between an operative range of maximum and minimum capacitances, and wherein said additional capacitor has a fixed capacitance value less than one-tenth of said minimum capacitance of said first capacitor.

6. A method for adjusting temperature variation of a capacitor, comprising the steps of:
providing a first capacitor between two end terminals, said first capacitor having a predetermined coefficient of capacitance (TCC) with a predetermined polarity;
connecting in parallel with said first capacitor across said two end terminals a series circuit comprising of a resistor connected in series with an additional capacitor, said additional capacitor having a predetermined TCC with a predetermined polarity opposite to the TCC polarity of said first capacitor;
providing an electrical signal having a predetermined operative signal frequency to the said series circuit and said first capacitor; and
changing the resistance in said series circuitry to achieve a desired composite TCC across said two terminals for the combination of said series circuit and said first capacitor, said resistance, when said desired composite TCC is achieved, providing a nonnegligible impedance at said operative signal frequency as compared to the impedances of said first or additional capacitors at said operative signal frequency.

7. A method according to claim 6 wherein said changing step is further specified in that said resistance, when said desired composite TCC is achieved, provides an impedance at said operative frequency no less than one hundredth of the magnitude of the impedances of either of said first or additional capacitors.

8. A method according to claim 7 wherein said first capacitor comprises a capacitor whose capacitance varies in accordance with a predetermined sensed parameter other than temperature, and wherein said changing step comprises reducing the absolute magnitude of the composite temperature variation of capacitance between said two end terminals.

9. A method according to claim 8 wherein said predetermined operative frequency of said first electrical signal is determined by at least the magnitude of the capacitance of said first capacitor, and which includes the step of providing an output signal varying in accordance with said sensed parameter.

10. A method according to claim 9 wherein said changing step comprises increasing the resistance in said series circuit by trimming said resistor which is a film resistor deposited on a substrate.

11. A capacitive sensor with temperature compensation comprising:
a capacitive transducer element connected between two end terminals, said capacitor transducer element providing between said end terminals a variable capacitance which varies in accordance with a variable parameter, other than temperature, the magnitude of which is desired to be sensed, said variable capacitance having a predetermined temperature coefficient of capacitance (TCC) with a predetermined polarity which provides an undesired capacitance variation as a function of temperature;
sensor circuit means, including said capacitive transducer element, in which an electrical signal at a predetermined operative frequency is applied to said transducer element to provide an output signal varying in accordance with the capacitance variation of said transducer element provided across said two end terminals in response to said sensed variable parameter; and
compensation means, coupled to said transducer element, for altering the temperature variation of said output signal, said compensation means comprising,
a series circuit comprising a compensation capacitor connected in series with a resistor, said series circuit being connected across said end terminals and in parallel to said capacitive transducer element, said compensation capacitor having a temperature coefficient of capacitance of opposite polarity with respect to the polarity of the temperature coefficient of capacitance of said variable capacitance, and said resistor providing a nonnegligible resistive impedance at said predetermined operative frequency with respect to the reactive impedances of said variable capacitance or said compensation capacitor, whereby said series circuit can provide for adjusting the temperature variation of said output signal by adjusting the magnitude of said resistor.

12. A sensor according to claim 11 wherein said parameter corresponds to pressure of a fluid of a liquid or gaseous medium, and wherein said compensation capacitor provides a capacitance which is substantially constant with respect to variations of said pressure.

13. A sensor according to claim 12 wherein said sensor circuit means includes an oscillator circuit for producing said electrical signal.

14. A sensor according to claim 13 wherein the magnitude of said variable capacitance determines said operative frequency of said electrical signal.

15. A sensor according to claim 12 wherein said temperature coefficient of capacitance of said compensation capacitor is fixed and wherein said temperature coefficient of capacitance of said variable capacitor is fixed.

16. A sensor according to claim 12 wherein said temperature coefficient of capacitance of said compensation capacitor is higher in absolute magnitude than said temperature coefficient of capacitance of said capacitive transducer element.

17. A sensor according to claim 16 wherein said resistor comprises a film resistor deposited on a substrate which is adjustable to a higher value by trimming techniques and wherein said resistor initially has a relatively low value which is then subsequently adjusted upward to a higher final magnitude.

18. A sensor according to claim 12 wherein said magnitude of said resistor is no less than one hundredth of the magnitude of the impedances, at said operative frequency, of either said variable capacitance or said compensating capacitor and no more than one hundred times the impedance of said variable capacitance or compensating capacitor.

19. A sensor according to claim 11 wherein said capacitive transducer element comprises a parallel plate capacitor with a predetermined spacing between plates that varies in accordance with said sensed parameter.

20. A sensor according to claim 11 wherein said variable capacitance varies in accordance with said sensed parameter between maximum and minimum capacitance values and wherein the capacitance of said compensating capacitor is less than one-tenth of said minimum capacitance of said variable capacitance.

* * * * *